United States Patent
Stiesdal

(10) Patent No.: US 8,992,170 B2
(45) Date of Patent: Mar. 31, 2015

(54) WIND TURBINE, METHOD OF CONTROL OF A WIND TURBINE AND AIR-CONDITIONING SYSTEM

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 641 days.

(21) Appl. No.: 13/307,281

(22) Filed: Nov. 30, 2011

(65) Prior Publication Data

US 2012/0156053 A1    Jun. 21, 2012

(30) Foreign Application Priority Data

Dec. 20, 2010  (EP) ..................................... 10195990

(51) Int. Cl.
*F03D 11/00*    (2006.01)

(52) U.S. Cl.
CPC ............. *F03D 11/00* (2013.01); *F05B 2240/14* (2013.01); *F05B 2260/20* (2013.01); *F05B 2260/64* (2013.01); *Y02E 10/722* (2013.01); *Y02E 10/726* (2013.01)
USPC .......................................... 415/176; 415/177

(58) Field of Classification Search
USPC .............. 415/108, 114, 121.3, 175, 176, 177, 415/178
See application file for complete search history.

(56) References Cited

U.S. PATENT DOCUMENTS

| | | | |
|---|---|---|---|
| 7,057,305 B2 * | 6/2006 | Kruger-Gotzmann et al. | 290/55 |
| 8,047,774 B2 * | 11/2011 | Bagepalli | 415/176 |
| 8,092,151 B2 * | 1/2012 | Becker | 415/112 |
| 8,109,814 B2 * | 2/2012 | Uchino et al. | 454/184 |
| 8,322,985 B2 * | 12/2012 | Kawai et al. | 416/93 R |
| 8,632,303 B2 * | 1/2014 | Akashi et al. | 415/176 |
| 8,640,478 B2 * | 2/2014 | Kim et al. | 62/259.1 |
| 2008/0197638 A1 | 8/2008 | Wobben | |
| 2010/0061853 A1 * | 3/2010 | Bagepalli | 416/95 |
| 2010/0119370 A1 * | 5/2010 | Myhr | 416/39 |
| 2010/0164228 A1 | 7/2010 | Matsuo et al. | |
| 2011/0012362 A1 * | 1/2011 | Kawai et al. | 290/55 |
| 2011/0204652 A1 * | 8/2011 | Sato et al. | 290/1 B |
| 2011/0221204 A1 * | 9/2011 | Kim et al. | 290/55 |
| 2012/0156053 A1 * | 6/2012 | Stiesdal | 416/93 R |
| 2013/0056989 A1 * | 3/2013 | Sabhapathy | 290/55 |

FOREIGN PATENT DOCUMENTS

| | | |
|---|---|---|
| CN | 101334007 A | 12/2008 |
| DE | 102007054215 A1 | 5/2009 |
| DE | 102008053814 A1 | 2/2010 |
| EP | 2146069 A1 | 1/2010 |
| EP | 2163761 A1 | 3/2010 |

(Continued)

OTHER PUBLICATIONS

Machine translation of KR 20100026865 A from EPO.*

(Continued)

*Primary Examiner* — Edward Look
*Assistant Examiner* — Christopher R Legendre

(57) ABSTRACT

A wind turbine having an air-conditioning system is provided. The air-conditioning system controls the climatization of the interior of the nacelle of the wind turbine. The air conditioning system includes at least one air inlet for ventilating the interior with air intake from outside of the wind turbine. The air-conditioning system also includes a heater for heating the air intake.

12 Claims, 1 Drawing Sheet

(56) References Cited

FOREIGN PATENT DOCUMENTS

| EP | 246612-8 | A1 | | 6/2012 |
|----|----------|----|----|--------|
| EP | 2175132 | A1 | | 6/2012 |
| JP | 2009127505 | A | * | 6/2009 |
| JP | 2009185841 | A | | 8/2009 |
| KR | 20100026865 | A | * | 10/2010 |
| WO | WO 2010085961 | A2 | * | 8/2010 |

OTHER PUBLICATIONS

Machine translation of JP 2009127505 A from JPO.*

Enercon; "MawsomStation": Wikipedia; found on Apr. 16, 2014 on the internal: http://de.wikipedia.org/wiki/Mawson-Station; pp. 1-3.
Legault R. et al.: "Wind energy in cold climate": NEG Micons: pp. 1; 1998.
Byggeth N. G. et al.: "Drive Train Assembly of the Swedish W TS 3"; Third International Symposium on Wind Energy Systems: pp. 253-267: Aug. 26, 1980.
Wang YI-JIA: "Air Condition System Design for Nacelle of Wind Turbine Generator System of Low Temperature Type": pp. 1-13; Nov. 22, 2010.
Stiesdal Henrik et al.: "10 Years with Arctic Modifications—A Manufacturer's Experience"; Boreas; pp. 1-11; Mar. 31, 1998.

* cited by examiner

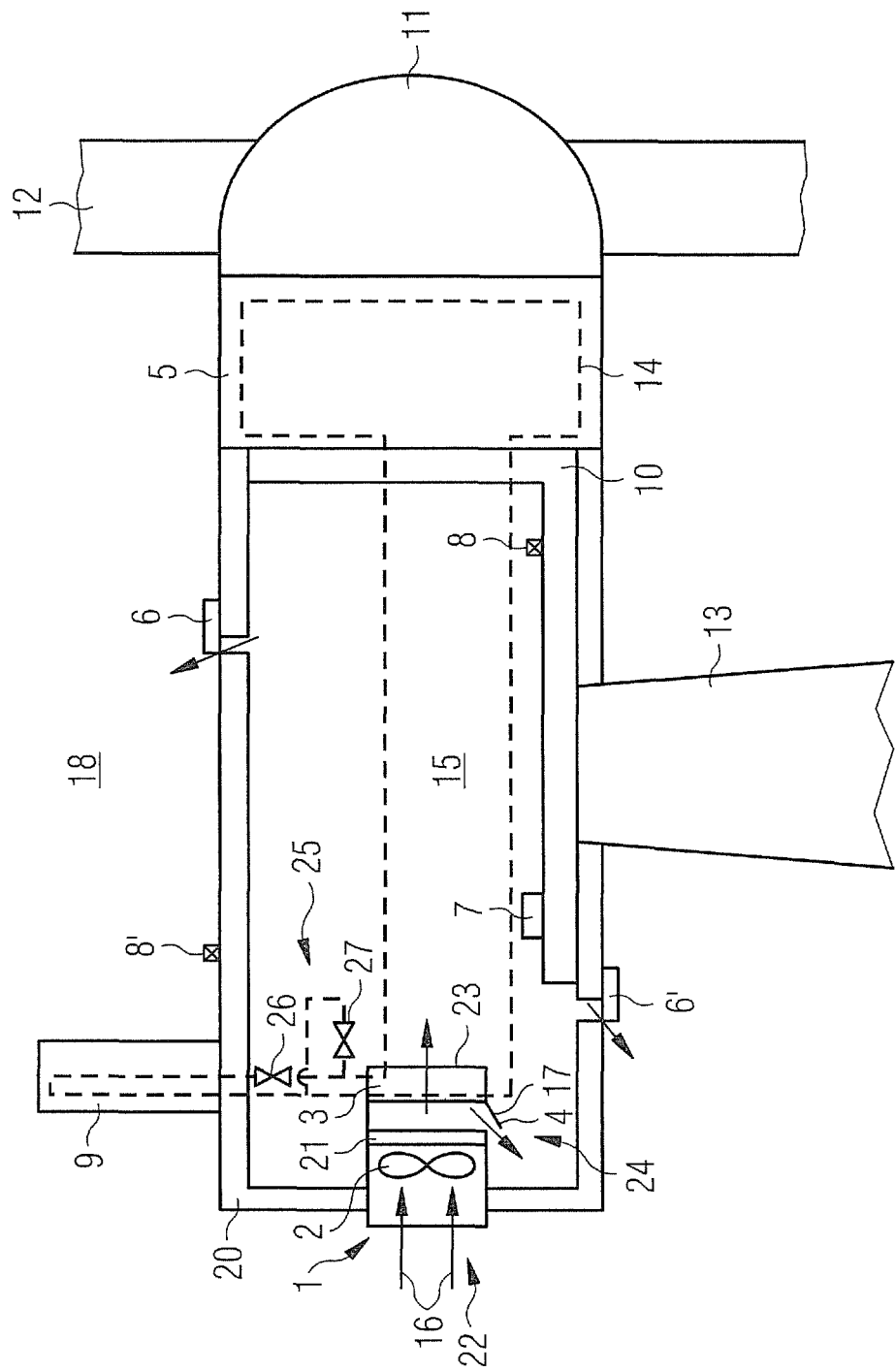

WIND TURBINE, METHOD OF CONTROL OF A WIND TURBINE AND AIR-CONDITIONING SYSTEM

CROSS REFERENCE TO RELATED APPLICATIONS

This application claims priority of European Patent Office application No. 10195990.6 filed Dec. 20, 2010, which is incorporated by reference herein in its entirety.

FIELD OF INVENTION

The present invention concerns a wind turbine comprising an air-conditioning system realized to control the climatisation of the interior of the nacelle of the wind turbine, whereby the air-conditioning system comprises an air inlet system realized to ventilate the interior with air intake from outside of the wind turbine. It also concerns a method for controlling a wind turbine and an air-conditioning system for a wind turbine.

BACKGROUND OF INVENTION

A wind turbine usually comprises a tower and at the upper end of the tower a nacelle with a canopy which encloses the interior of the nacelle. A rotor hub of the wind turbine which comprises one or more blades is positioned at one end of the nacelle. If the generator is an indirect drive generator the rotor hub is connected to a main shaft which protrudes into the nacelle to a gearbox connected to a generator. Otherwise, if the generator is a gearless direct driven generator, the rotor of the generator is driven directly by the rotor hub where the generator is placed between and connected to the rotor hub and the nacelle. There may be direct access to the generator and the hub from the inside of the nacelle. Usually, several devices of the wind turbine are situated in the nacelle, as for example a brake system and a controller and in a geared wind turbine also the gearbox and the generator.

US 2008/0197638 A1 discloses a nacelle with a generator where a ventilator or fan is placed inside the nacelle driving outside air into the nacelle through a downwardly open gap positioned between a tower and the nacelle. The fan may together with a second fan ensure an overpressure in the nacelle and finally the air issues through an air gap on the nacelle. Moisture will not be removed from the sucked-in air. Therefore moisture will be depositing on the windings of the generator or on the installations in the nacelle reducing the life time of the wind turbine.

SUMMARY OF INVENTION

It is the object of the invention to provide a wind turbine with an improved life time.

This object of the invention is solved by the features of the independent claims.

Accordingly, the wind turbine comprises an air-conditioning system realized to control the climatisation of the interior of the wind turbine, whereby the air-conditioning system comprises a least an air inlet system realized to ventilate the interior with air intake from outside of the wind turbine is characterized by that the air-conditioning system, in particular the air inlet system, comprises a heater realized to heat the air taken from outside.

According to the invention a method of control of a wind turbine comprising an air-conditioning system realized to control the climatisation of the interior of the wind turbine, whereby the air-conditioning system comprises a least one air inlet system ventilating the interior with air taken from outside of the wind turbine, is provided, in which the air intake is heated by a heater.

Such an air-conditioning system, which comprises at least an air inlet system realized to ventilate the interior with air intake from outside of the wind turbine and a heater realized to heat the air intake from outside, may be provided by a retrofit kit for upgrading an already existing wind turbine.

Such an air-conditioning system for a wind turbine according to the invention may preferably comprise a controller for controlling the amount of air conveyed into the nacelle.

By the heater according to the invention the air is heated before it is allowed to spread into the interior of the nacelle. By pre-heating of the air intake from outside it can be ensured that the interior of the nacelle is warm and dry which prevents moisture deposits on installations in the nacelle and, in particular, on the windings of the generator.

Particularly advantageous embodiments and features of the invention are given by the dependent claims, as revealed in the following description. Thereby, features revealed in the context of the wind turbine may also be realized in the context of the method of control of a wind turbine.

The heater could comprise an electrical heater. Such an electrical heater is easy to install in a wind turbine and easy to control. In a preferred embodiment the heater comprises a heat exchanger connected to a liquid cooling system of the wind turbine. Such a liquid cooling system is usually a closed circuit, in which a circulating cooling liquid is heated up by components which have to be cooled, for example by the generator or a heat exchanger used for cooling an electrical control system or similar, and conveys thermal energy from such components to a heat exchanger outside of the nacelle at which the cooling liquid is cooled down again. According to this preferred embodiment of the invention, the heat exchanger transfers the thermal energy from the cooling liquid to the air taken from outside. Accordingly, that embodiment recovers thermal energy of the components which have to be cooled, in particular of the generator. For this purpose, the liquid cooling system is preferably connected to a generator and/or a cooling system for electrical components of the wind turbine to transfer heat energy from the generator and/or the cooling system to the heat exchanger.

In an elementary embodiment the nacelle may simply comprise an opening on the windward side of the wind turbine for ventilating the interior of the nacelle by the wind. In a preferred embodiment the air inlet system comprises a fan realized to convey air from outside into the interior. This allows to convey air into the interior with determinant rate, e.g. a special amount per hour, for example and therefore to prevent deposit of moisture. Further, this allows also to arrange the fan on the lee side of the wind turbine. However, it is clear that an air inlet system comprising a fan may also be used with an opening on the windward side.

As explained above, the nacelle comprises a canopy enclosing the interior of nacelle. In a preferred embodiment at least one of the air inlet systems is comprised in the canopy. For example, the canopy may have an opening realized to convey air taken from outside to the interior by the air inlet system. Preferably, the fan could be fixed in that opening holding the filter which filters air sucked from outside through the opening.

In a particular preferred embodiment the air inlet system comprises a filter realized to filter the air intake from outside. The filter will keep back salt particles or other particles that are therefore not sucked into the interior. This prevents deposition of dirt and/or salt particles.

The filter may be preferably made from a textile material. To clean the filter the material could be changed or cleaned periodically. An alternative to clean the filter may be to generate a backflow through the filter. For example, the fan could be driven in first direction normally and in a second direction opposite to the first direction to generate such a backflow.

As explained above, the nacelle comprises a canopy enclosing the interior of nacelle. In a preferred embodiment at least one of the air inlet systems is comprised in the canopy. For example, the canopy may have an opening realized to convey air taken form outside to the interior by the air inlet system. Preferably, the fan could be fixed in that opening holding the filter which filters air sucked from outside through the opening.

Furthermore, at least one of the air inlet systems may be situated in the tower and/or in the interface between the tower and the nacelle such that air may propagate from the tower through the heater and the tower-nacelle-interface into the interior of the nacelle. In such an embodiment the tower may have an appropriate opening so that the air may enter the tower.

Further, the air inlet system is preferably realized to create and to maintain an overpressure in the interior in respect to the outside of the interior. This prevents humidity and salt entering the nacelle from any other opening in the canopy of the nacelle, e.g. gaps between different parts of the canopy or between the canopy and the main shaft etc. The overpressure air from the nacelle may in particular be led into the generator to avoid humid and salty air entering the generator.

In a preferred embodiment a one-way seal or one-way valve is provided in an air outlet opening in the canopy realized to let air flow out of the interior of the nacelle. Such a one-way seal or valve ensures that no (unfiltered) air may enter the nacelle through the air outlet and therefore prevents the entering of dirt particles.

The air-conditioning system may preferably comprise a temperature sensor arrangement comprising a number of temperature sensors realized to measure the air temperature inside the interior and/or the temperature of a generator of the wind turbine.

To compare the measured temperature with a chosen temperature the air-conditioning system, in a particular preferred embodiment, may comprise a controller which is connected to sensors of the temperature sensor arrangement. This allows an accurate temperature control of the interior of the nacelle. Depending on the measured temperatures the heater could be activated or deactivated to adjust the temperature of the air.

In a preferred embodiment a heater bypass system is provided as part of the air-conditioning system, which allows the incoming air to circumvent the heater. Such a bypass system comprises means realized to reduce the amount of conveyed air to the heater. This allows additionally or alternatively to adjusting the temperature of the heater to control the temperature in the nacelle by controlling the amount of air which is conveyed to the heater depending on the measured temperature by the temperature sensor. In other words, the controller may ensure that the temperature will be kept at a chosen set-point temperature by controlling the heating up of the incoming air by the temperature of the heater and/or by adjusting the amount of conveyed air into the nacelle.

In a preferred embodiment the bypass system comprises an actuator and a valve or baffle, whereby the actuator is connected to the valve or baffle to position the valve or baffle in at least two different positions, and whereby the controller is connected to the actuator to control the actuator. In particular, the baffle may be positioned in any position between a completely opened and a completely closed position. The actuator could be an electric/hydraulic/pneumatic controlled motor. According to the position of the baffle the amount of air taken conveyed to the heat exchanger could be adjusted. Therefore the air taken from outside is heated more or less, depending on the measured temperature with the temperature sensors. That allows adjusting the heating according to the temperature outside the nacelle.

Further, the air-conditioning system may comprise a cooling liquid bypass, controlled by a controller, in order to control the amount of cooling liquid conveyed to liquid-to-air heat exchanger. This allows a quick up heating of the interior of the nacelle by reducing the flow of cooling liquid to air to liquid heat exchanger.

BRIEF DESCRIPTION OF THE DRAWINGS

Other objects and features of the present invention will be become apparent from the following detailed description considered in conjunction with the accompanying drawing. It is to be understood, however, that the thawing is designed solely for the purpose of illustration and not as definition of the limits of the invention. In the drawing, like reference numbers refer to like objects throughout. Objects in the diagram are not necessarily drawn to scale.

The sole FIGURE shows a cross-section of a wind turbine according to the invention.

DETAILED DESCRIPTION OF INVENTION

The wind turbine as shown in the FIGURE, for example an offshore gearless direct driven wind turbine, comprises a nacelle 10 pivotally mounted on a tower 13. The nacelle 10 comprises a canopy 20 enclosing the nacelle 10. The canopy may enclose various components of a wind turbine for example an electrical control system (not shown). In connection to the nacelle 10 and the interior 15 of the nacelle 10 a generator 5 is attached for converting mechanical energy into electrical energy. A rotor (not shown) of the generator 5 is rigidly fixed with a hub 11 comprising blades 12 for transforming wind energy into a rotation of the hub 11, which in turn drives the rotor of the generator 5 to produce electric energy.

The wind turbine according to FIG. 1 comprises a direct drive, in which the hub 11 with the blades 12 is directly mechanically coupled to the rotor of the generator 5 without any gear there between.

For cooling the generator 5 a liquid cooling system 14 is provided. The liquid cooling system 14 comprises a liquid-to-air heat exchanger 9 outside of the nacelle 10 for cooling down the cooling liquid circulating in the liquid cooling system 14 by transferring heat generated by the generator 5 to air which passes the nacelle 10.

The wind turbine comprises an air-conditioning system realized to control the climatisation in the interior 15 of the nacelle 10. This air-conditioning system comprises an air inlet system 1 for ventilating the interior 15 of the nacelle 10, a temperature sensor arrangement with two temperature sensors 8, 8' for measuring the temperature in the interior 15 of the nacelle 10 and at the outside 18 of the interior 15, and a controller 7, which controls at least parts of the air-conditioning system based on the temperature values measured by the temperature sensor arrangement In the embodiment shown in the figure, the canopy 20 is provided with an opening 22 to convey air into the interior 15 of the nacelle 10. The opening 22 is on the lee side of the wind turbine, whereby the hub 11 with the blades 12 is on the windward side.

The air inlet system 1 further comprises a fan 2, which—at work—sucks air from the outside 18 of the nacelle. The fan is, for example, driven by an electric motor (not shown). The fan 2 is realized to create and to maintain an overpressure, preferably a super-atmospheric pressure, in the interior 15 in respect to the outside 18 of the interior 15.

Furthermore, the air-conditioning system comprises a heater 23 to heat the air intake 16 of the nacelle 10, a filter 21 to filter the air intake 16 and a heater bypass system 4 with means realized to control the part of the conveyed air which comes in contact to the heater 23 and the part of air which circumvents the heater 23.

To ensure a suitable air flow through the interior 15 of the nacelle 10, the nacelle 10 is provided with two one-way valves 6, 6' through which, because of the overpressure, air may flow from the inside 15 to the outside 18 of the nacelle 10. A first one-way valve 6 is situated on the top side of the nacelle 10 and the second one-way valve 6' is situated on lower side of the nacelle 10. This airflow may also pass through the generator 5 attached to the nacelle 10. This increases the cooling of the generator depending on whether the generator 5 is warm or cold compared to the temperature of the heated air. If the generator 5 is warmer than the air the airflow may increase the cooling of the generator 5.

The filter 21 is provided in the direction of flow behind the fan 2 to ensure that salt particles or other particles are not sucked into the nacelle 10. The heater 23 is provided in the direction of flow behind the filter 21.

In the shown embodiment the heater 23 comprises a heat exchanger 3 coupled with the liquid cooling system 14 to cool the generator 5. Accordingly, hot cooling liquid is conveyed from the generator 5 to the heat exchanger 3 and heats the air which is sucked by the fan 2 from outside 18 to the inside of the nacelle 10. An electrical heater may be additionally provided, for example to assist the heat exchanger 3 by heating the air intake 16 from outside 18.

Between the filter 21 and the heat exchanger 3 the bypass system 4 is arranged comprising a baffle 17 for opening and closing a heater bypass 24. The baffle 17 is connected to an actuator (not shown) to position the baffle 17 in any position between fully opened or fully closed. The actuator may be an electric/hydraulic/pneumatic controlled motor. According to the position of the baffle 17 the amount of air intake 16 from outside 18 which passes the heat exchanger 3 is amended and accordingly the amount of air passing the heater bypass 24. Therefore the air taken from outside 16 is heated more or less.

The controller 7 is connected to the actuator for driving the actuator. Furthermore, the controller 7 is connected wirelessly or by wire to the temperature sensors 8, 8'. One temperature sensor 8 senses the temperature of the air inside the nacelle 10 and also the temperature of the generator 5. The other temperature sensor 8' senses the temperature at the outside 16. The controller 7 controls the temperature in the nacelle 10 and/or generator 5 to ensure that the temperature is above a chosen temperature. A dew point sensor is preferably provided improving the accuracy of preventing moisture deposits.

Further, the controller 7 is connected to the fan 2 to maintain a super-atmospheric pressure in the interior 15 in respect to the outside 18 of the interior 15.

Accordingly, the controller 7 drives the actuator to open or close the baffle 17 more or less to open the heater bypass 24 more or less to change the amount of air depending on the temperatures measured by the temperature sensors 8, 8' to maintain the temperature in the interior 15 of the nacelle 10 above a chosen temperature.

A cooling liquid bypass 25 is provided as part of the liquid cooling system 14, which allows the circulating cooling liquid to circumvent the heat exchanger 9 outside of the nacelle 10. Such a cooling liquid bypass 25 comprises two valves 26, 27 to reduce the amount of cooling liquid conveyed to the heat exchanger 9. This allows additionally or alternatively to adjusting the temperature of the heater 23 to control the temperature in the nacelle by changing the amount of thermal energy conveyed to the outside 18 of the nacelle 10. With other words, the amount of thermal energy wasted to the environmental of the wind turbine could be reduced to speed up the heating up of air intake 16. This allows improving the degree of energy recovering.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" through this application does not exclude a plurality, and "comprising" does not exclude other steps or elements.

The invention claimed is:

1. A method of control of a wind turbine having a nacelle, comprising:
controlling a climatization of an interior of the nacelle via an air-conditioning system, by:
ventilating the interior with air intake from outside of the wind turbine via one or more air inlet systems of the air-conditioning system,
heating the air intake via one or more heaters of the air conditioning system, and
measuring, via a temperature sensor arrangement in the air-conditioning system, at least one of an air temperature inside the nacelle, a temperature of a generator of the wind turbine, and a temperature of the outside ambient air of the wind turbine,
wherein the nacelle comprises a canopy enclosing the interior of the nacelle and wherein at least one of the one or more air inlet systems is comprised in the canopy,
controlling the amount of conveyed air to the one or more heaters depending on the measured temperature in order to control the air temperature inside the nacelle and/or the temperature of a generator of the wind turbine,
wherein the air-conditioning system comprises a heater bypass system configured to reduce the amount of conveyed air to the one or more heaters.

2. A wind turbine, comprising:
a nacelle; and
an air-conditioning system for controlling a climatization of an interior of the nacelle,
wherein the air-conditioning system comprises one or more air inlet systems configured for ventilating the interior with air intake from outside of the wind turbine,
wherein the air-conditioning system comprises one or more heaters for heating the air intake,
wherein the air-conditioning system comprises a temperature sensor arrangement configured to measure at least one of an air temperature inside the nacelle, a temperature of a generator of the wind turbine, and a temperature of the outside ambient air of the wind turbine,
wherein the air-conditioning system comprises a controller connected to the temperature sensor arrangement,
wherein the air-conditioning system further comprises:
a heater bypass system configured to reduce the amount of conveyed air to the one or more heaters,
wherein the controller is configured to control the air temperature inside the nacelle and/or the temperature of a generator of the wind turbine by controlling the amount of conveyed air to the one or more heaters depending on the measured temperature.

3. A wind turbine according to claim 2, wherein the bypass system comprises an actuator and a valve or baffle, wherein the actuator is connected to the valve or baffle for positioning the valve or baffle in at least two different positions, and whereby the controller is connected to the actuator to control the actuator.

4. A wind turbine, comprising:
a nacelle; and
an air-conditioning system for controlling a climatization of an interior of the nacelle,
wherein the air-conditioning system comprises one or more air inlet systems configured for ventilating the interior with air intake from outside of the wind turbine,
wherein the air-conditioning system comprises one or more heaters for heating the air intake,
wherein the nacelle comprises a canopy enclosing the interior of the nacelle and wherein at least one of the one or more air inlet systems is comprised in the canopy, and
wherein the air-conditioning system comprises a temperature sensor arrangement configured to measure at least one of an air temperature inside the nacelle, a temperature of a generator of the wind turbine, and a temperature of the outside ambient air of the wind turbine wherein heated air from the one or more heaters is led into a generator of the wind turbine.

5. The wind turbine according to claim 4, wherein at least one of the one or more heaters comprises an electrical heater.

6. The wind turbine according to claim 4, wherein at least one of the one or more heaters comprises a heat exchanger connected to a liquid cooling system of the wind turbine.

7. The wind turbine according to claim 6, wherein the liquid cooling system is connected to a generator to transfer heat energy from the generator to the heat exchanger.

8. The wind turbine according to claim 4, wherein at least one of the one or more air inlet systems comprise one or more fans configured to convey air intake into the interior.

9. The wind turbine according to claim 4, wherein at least one of the one or more air inlet systems comprises one or more air filters realized to filter the air intake.

10. The wind turbine according to claim 4, wherein at least one of the one or more air inlet systems are configured to create and to maintain an overpressure in the interior in respect to the outside of the interior.

11. The wind turbine according to claim 10, wherein a one-way seal or one-way valve is provided realized to let air flow out of the nacelle.

12. The wind turbine according to claim 4, wherein the air-conditioning system comprises a controller connected to the temperature sensor arrangement.

* * * * *